United States Patent [19]
Arita

[11] 3,778,637
[45] Dec. 11, 1973

[54] APPARATUS FOR SUPPLYING A PREDETERMINED QUANTITY OF ELECTRIC POWER

[76] Inventor: Koshei Arita, 10, 23, 2-chome, Minamimagome, Ohota-ku, Tokyo, Japan

[22] Filed: Dec. 10, 1971

[21] Appl. No.: 206,684

[30] Foreign Application Priority Data
June 18, 1971 Japan.................. 46/43352

[52] U.S. Cl..................... 307/140, 194/4 F, 194/11
[51] Int. Cl............................................... G07f 1/06
[58] Field of Search....................... 194/9 T, 11; 307/149, 150, 139, 140

[56] References Cited
UNITED STATES PATENTS
3,064,787  11/1962  Davis..................... 194/11

*Primary Examiner*—Gerald Goldberg
*Assistant Examiner*—Harry E. Moose, Jr.
*Attorney*—Charles W. Helzer

[57] ABSTRACT

Apparatus for supplying a predetermined measured quantity of electric power. Specially designed chit in form of a chip inserted in a receptacle operates a switch in main power line to supply predetermined measured quantity of power whereupon apparatus automatically opens switch if apparatus has not been reactivated by insertion of another chip. An alarm system is activated in advance of measured amount of power being used to warn consumer that service will be discontinued if apparatus is not reactivated by insertion of another chip.

10 Claims, 4 Drawing Figures

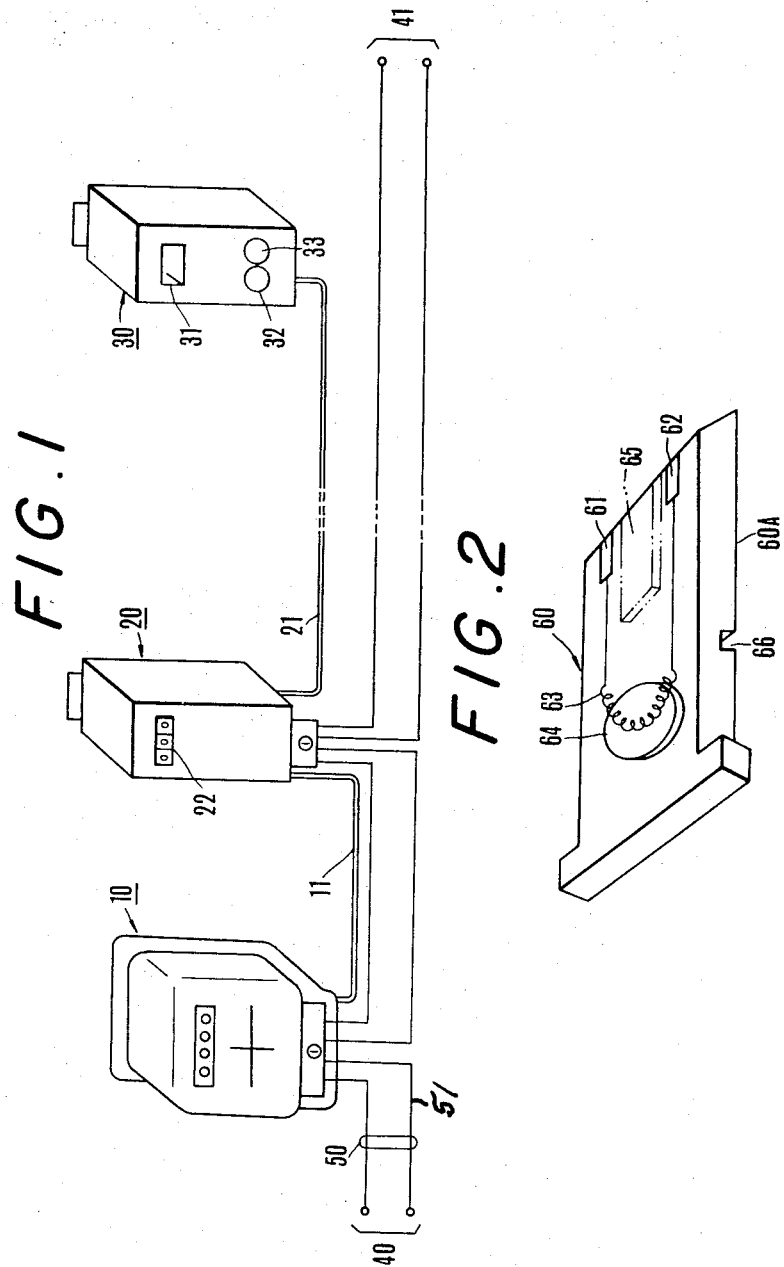

APPARATUS FOR SUPPLYING A PREDETERMINED QUANTITY OF ELECTRIC POWER

BACKGROUND OF THE INVENTION

1. Field of Invention

This invention relates to apparatus for supplying a predetermined measured quantity of electric power.

2. Prior Art Problem

It is usual to calculate the fee to be paid for electric power consumed by a customer by checking the indication of an integrating watt-hour meter installed at the customer's premises. For this reason, a service man of a utility company is required periodically to visit the customer to record the indication of the integrating watt-hour meter. Where the watt-hour meter is installed inside a house, the service man can not read the watt-hour meter when the customer is absent.

SUMMARY OF INVENTION

It is an object of this invention to provide an improved apparatus for supplying a predetermined measured quantity of electric power without the necessity of periodic reading of the integrating watt-hour meter.

A further object of this invention is to provide a new apparatus for supplying electric power which utilizes a specially designed chip that functions as a chit to activated the apparatus and supply a prescribed quantity of electric power whereby the power can be utilized either continuously or intermittently, until the predetermined quantity is reached.

Another object of this invention is to provide such an apparatus for supplying a predetermined measured quantity of electric power which commences supply of power and then operates an alarm when nearly all of the predetermined quantity of electric power has been consumed to thereby advise the consumer that the predetermined quantity will soon be depleted.

Still another object of this invention is to provide such an improved apparatus for supplying a predetermined measured quantity of electric power wherein a chip inserted in the apparatus to activate it, is held therein until nearly all of the predetermined quantity of electric power has been consumed and then automatically is released in order to receive the next chip.

A still further object of this invention is to provide such an apparatus wherein electric power can be supplied continuously without interruption upon the next chip being inserted during the interval while the alarm is operated.

Yet another object of the invention is to provide such an apparatus for supplying a predetermined quantity of electric power which utilizes a new type chip for use as a chit to control supply of power to a consumer through the apparatus.

Further objects and advantages of the invention will become apparent from the following detailed description.

According to this invention there is provided apparatus for supplying a predetermined measured quantity of electric power to a consumer upon actuation by the insertion of an authentic chip. The apparatus comprises an integrating watt-hour meter, a signal transmitter operated by the watt-hour meter for developing an electrical alarm signal within a range of consumed power between a value smaller than the predetermined quantity and the predetermined quantity, a main power switch connected between the watt-hour meter and the load, a chip receiver, a chip to be inserted in the chip receiver, alarm means responsive to the electrical alarm signal, means responsive to the insertion of the chip into the chip receiver for closing the main power switch, and means responsive to completion of the predetermined measured quantity of electric power and the termination of the electrical alarm signal for opening the main power switch in the absence of a new chip being inserted in the chip receiver.

BRIEF DESCRIPTION OF DRAWINGS

FIG. 1 is a functional block diagram showing the arrangement of various elements of the apparatus embodying the invention;

FIG. 2 is a perspective view of novel chip utilized in this invention as a chit for activating the apparatus;

With reference to FIG. 1 showing a functional block diagram of the apparatus for supplying a predetermined quantity of electric power. The apparatus comprises an integrating watt-hour meter 10, a switch 20, and a chip receiver 30. The integrating watt-hour meter 10 has a construction substantially identical to that of a conventional integrating watt-hour meter except that it includes a signal transmitter to be described later which sends a signal when a definite quantity of electric power has been consumed and integrated into the measurement of the meter and stops the sending out of this signal when a remaining quantity of electric power has been consumed and the total amount of power measured by the meter equals the predetermined quantity. This signal is sent to switch 20 over a conductor 11. The switch 20 is constructed such that it commences supply of power to a customer when a chip in the form of a chip (to be described later) is inserted into chip receiver 30 and to interrupt the supply of power in response to the signal from the integrating watt-hour meter 10. Further, the switch 20 operates to send an alarm control signal informing the customer that the power supplied has reached the predetermined value. To this end, switch 20 and chip receiver 30 are interconnected by a conductor 21. Switch 20 is provided with a counter 22. Chip receiver 30 is constructed such that, in response to the insertion of a chip, it closes switch 20 and releases the inserted chip after a predetermined quantity of electricity has been consumed. The chip receiver is provided with a chip receiving opening 31 and alarm means in the form of a neon lamp 32 and a buzzer 33 and is installed in a customer's house. Terminals 40 are provided for connecting integrating watt-hour meter 10 and switch 20 to an AC 100 V source, not shown, through conductors 50 and 51 for supplying current, 30 A for example, to the load in the house through terminals 41.

FIG. 2 shows a perspective view of a chip 60 utilized in this invention as a chit to actuate the apparatus upon being inserted into opening 31 of chip receiver 30. The chip comprises a pair of contacts 61 and 62, a fuse 63 connected across these contacts, a special form of permanent magnet 64 to be described later and a check piece 65. These elements are mounted or embodied in a support of insulating material 60 A which is provided with a transverse groove 66 for retaining the chip in chip receiver 30 in a manner to be described later. When the chip is inserted into the chip receiver, electric current is passed through fuse 63 via contacts 61 and 62. The permanent magnet 64 is used to operate a reed switch to be described later and to determine whether the inserted chip is a genuine one or not according to the positions of the poles of the magnet. It is desirable to use a permanent magnet which vapourizes when heated for reasons to be explained later. When the chip 60 is inserted into opening 31, the check piece 65 is automatically peeled off or removed from support 60 A and retained in chip receiver 30. The check piece is printed or impressed with a prescribed code or mark so that it is possible to check whether the chip is genuine or not. Further, it is possible later to determine the total number of chips previously inserted by counting the number of check pieces remaining in the chip receiver.

Figure 3:
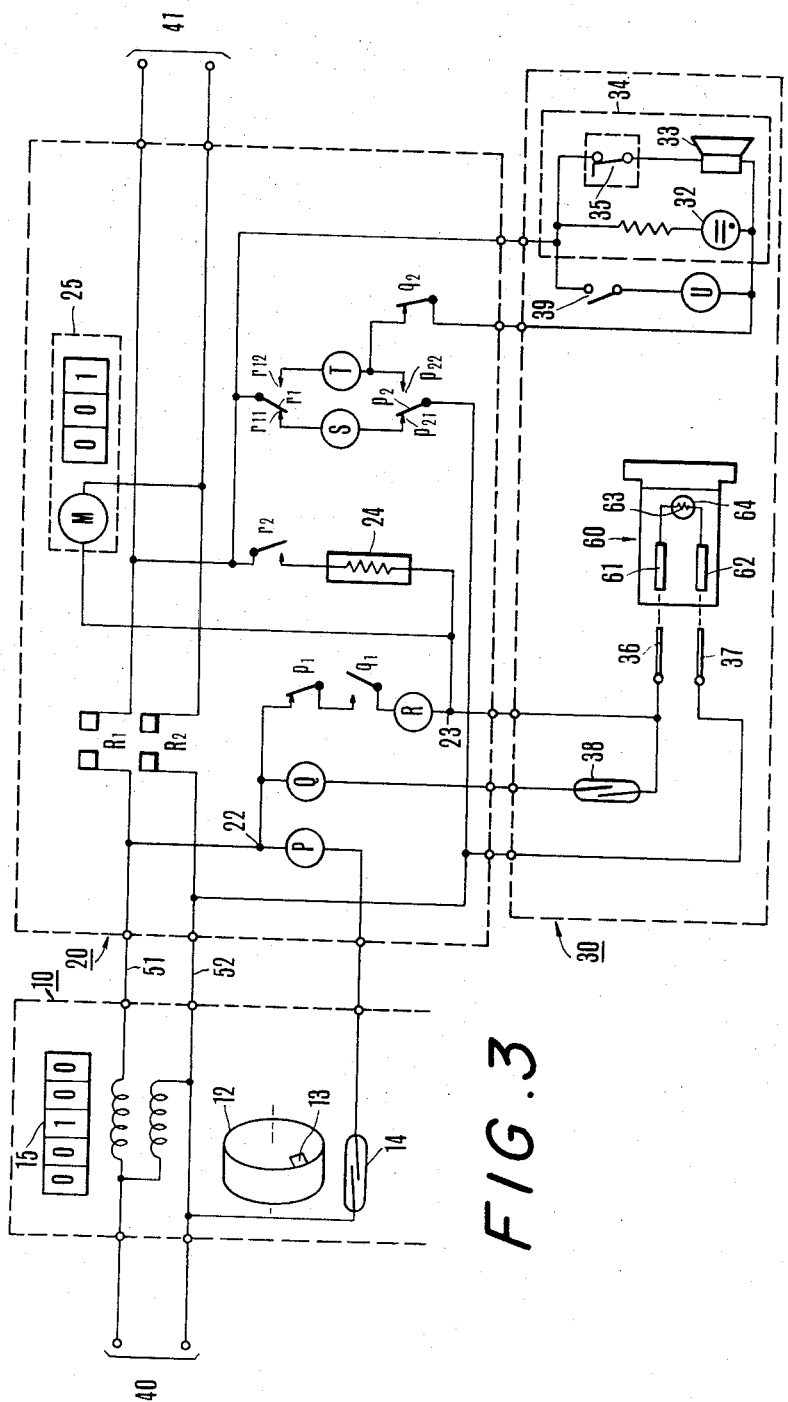
FIG. 3 is a schematic circuit diagram of one embodiment of the apparatus of this invention; and, FIG. 4 is a schematic diagram showing various relays and their contacts utilized in the circuit shown in FIG. 3.

In the following description, it is assumed that the power which can be supplied to the customer with one chip is 100 KWH which is the predetermined quantity of the electric power to be measured out by the apparatus. Further, it is assumed that the value of power close to this predetermined power is 90 KWH. Consequently, the watt-hour meter 10 is designed such that it commences transmission of a signal when it has integrated 90 KWH after insertion of a chip and stops the transmission of the signal when 100 KWH is reached. To this end, as shown in FIG. 3 a signal transmitter is provided comprising a permanent magnet 13 mounted on a digit wheel of the order of tens and a reed switch 14 positioned to be closed by the magnet 13. The reed switch 14 is positioned such that it is closed by the permanent magnet 13 when digit wheels of the order of tens and units display 90.0 in a display window 15 and that when a digit wheel of the order of decimal is rotated successively to shift the operation to the digit wheel of the order of hundreds, the magnet 13 is moved away from the reed switch 14, thus opening the same.

Main contacts $R_1$ and $R_2$ of switch 20 are included in conductors 51 and 52, respectively. One terminal of reed switch 14 is connected to conductor 52 whereas the other terminal to conductor 51 through a relay P contained in switch 20. The juncture 22 between relay P and conductor 51 is connected to one end of relay Q and to one end of a main relay R through a normally closed contact $p_1$ of relay P and a normally opened contact $q_1$ of relay Q. The opposite terminal 23 of relay R is connected through a current limiting resistor 24 and a normally opened contact $r_2$ of relay R to conductor 51 on the right hand side of contact $R_1$. The operating coil M of a counter 25 is connected across terminal 23 and conductor 52. Relays S and T contained in switch 20 are selectively connected across conductors 51 and 52 via transfer switches $r_1$ and $p_2$ which are operated by relays R and P respectively. Switch $r_1$ is connected to one terminal of an alarm device 34 contained in the chip receiver 30 whereas a stationary contact $p_{22}$ of transfer switch $p_2$ is connected to the other terminal of the alarm device 34. As above described the alarm device 34 comprises a neon lamp 32, a buzzer 33 and a reset button 35.

A pair of contact pieces 36 and 37 are provided in opening 31 of chip receiver 30 as shown in the lower middle portion of FIG. 3 to cooperate with contacts 61 and 62, respectively, of chip 60, and these contact pieces 36 and 37 are connected to conductor 52 and terminal 23, respectively. The other terminal of relay Q is connected to contact piece 36 through a reed switch 38 which is disposed to be operated by the permanent magnet 64 of chip 60. In parallel with the alarm device 34 is connected a series circuit including a contact 39 which is closed when the chip 60 is inserted into opening 31 and a coil U for releasing the chip when energized.

Figure 4:
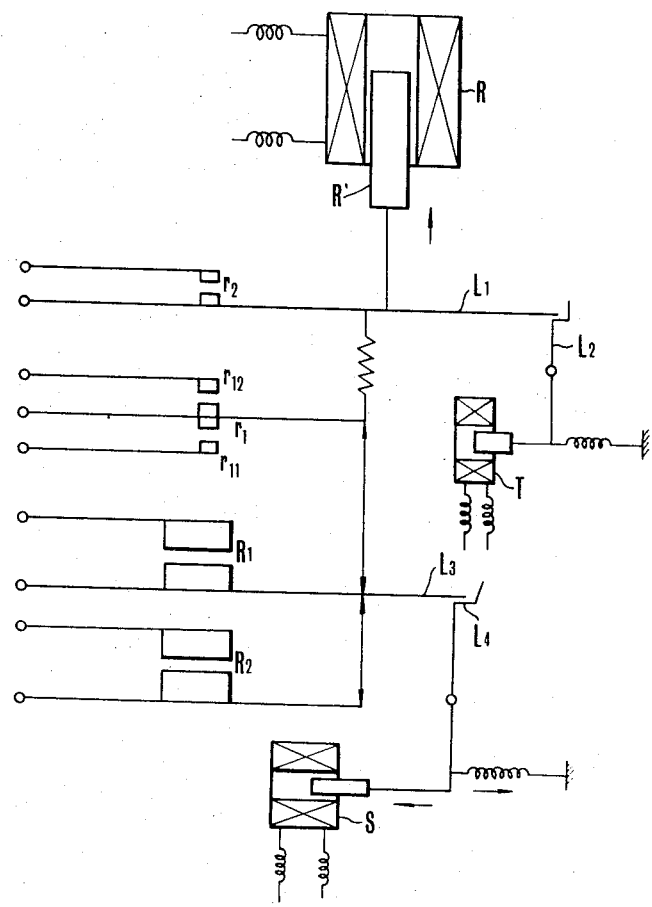

Main contacts $R_1$ and $R_2$ and transfer switch $r_1$ operated by relay R are maintained in their operated positions by a lever and catch mechanism diagrammatically shown in FIG. 4. More particularly, when the coil of relay R is energized, its plunger is attracted to close contacts $R_1$, $R_2$ and $r_2$. At the same time, transfer switch $r_1$ is switched to contact $r_{12}$ from its normally closed contact $r_{11}$. When relay R is deenergized contact $r_2$ is opened. However, transfer switch $r_1$ is held in contact with contact $r_{12}$ by the engagement of an operating lever $L_1$ with a catch $L_2$ which is actuated by a relay T and main contacts $R_1$ and $R_2$ are maintained closed by the engagement of a lever $L_3$ and a catch $L_4$ which is actuated by a relay S. Upon deenergization of relays T and S transfer switch $r_1$ is switched to contact $r_{11}$ while main contacts $R_1$ and $R_2$ are opened.

The apparatus thus far described operates as follows. First it is assumed that various contacts are in the states as shown in FIG. 3 and that the number of count of the integrating watt-hour meter 10 is zero. Under these conditions, upon insertion of a genuine chip 60 into opening 31 of chip receiver 30 the permanent magnet 64 comes to face reed switch 38, thus closing the same. As a result relay Q is energized to close its contact $q_1$ and open its contact $q_2$. During the insertion of chip 60, the check piece 65 is stripped off to be retained in chip receiver 30. Closure of contact $q_1$ establishes an energizing circuit for relay R that can be traced from conductor 51, through contacts $p_1$ and $q_1$, relay R and contacts 36, 61, fuse 63 and contacts 62 and 37 to conductor 52. As a consequence relay R is energized and transfer switch $r_1$ is switched to contact $r_{12}$, contact $r_2$ is closed and main contacts $R_1$ and $R_2$ are closed thus commencing the supply of electric power to the customer. Concurrently therewith the integrating watt-hour meter starts to integrate the power. Insertion of the chip also closes contact 39. Further, a locking bar, not shown, in the chip receiver 30 comes to engage groove 66 (see FIG. 2) of the chip thus locking the same in the inserted position, so that it is impossible to manually withdraw the chip out of the chip receiver 30.

Closure of contact $r_2$ passes a relatively large current through fuse 63 via current limiting resistor 24 thereby melting fuse 63 and evaporating magnet 64. Consequently reed switch 38 opens and relay Q is deenergized to open its contacts $q_1$ and close $q_2$. Opening of contact $q_1$ deenergizes relay R but contacts $R_1$ and $R_2$ are maintained in the closed condition and transfer contact $r_1$ is maintained in contact with contact $r_{12}$ by means of the mechanical lever and catch interlocking mechanism described above with relation to FIG. 4, thus ensuring continued supply of the power. During the interval in which contact $q_1$ is moved from the closed state to the opened state, current flows through operating coil M of counter 25, thus advancing the same by one digit. This counts the insertion of one chip so that the digits displayed by counter 25 represents the total number of chips inserted into the chip receiver.

When the watt-hour meter integrates a little short of the predetermined power 100 KWH, that is 90KWH in this example, permanent magnet 13 carried by wheel 12 of the order of tens will come to face reed switch 14, thus closing the same. Closure of the reed switch energizes relay P to open its contact $p_1$ and to switch transfer switch $p_2$ from contact $p_{21}$ to contact $p_{22}$. As a result, relay T is energized to disengage catch $L_2$ from lever $L_1$ thus permitting transfer switch $r_1$ to reengage contact $r_{11}$, as has been described with reference to FIG. 4. At the same time, alarm device 34 is energized by a circuit extending through contacts $q_2$ and $p_{22}$ and transfer switch $p_2$. Consequently, neon lamp 32 and buzzer 34 are energized to give visible and audible alarms to the customer informing him that the predetermined power will soon be reached. Closure of contact $p_{22}$ also energizes coil U for releasing the chip by disengaging the locking bar described above from groove 66 thus driving the chip to the outside of the chip receiver by the force of a spring, not shown. With respect to the chip released in this manner, the fuse 63 has melted and magnet 64 evaporated as above described so that such a chip can not be used again to actuate the apparatus.

Upon the alarm 34 being operated when power consumption has reached 90 KWH as above described, the consumer will be in either one of the following two conditions:

1. The power required is equal to or less than 100 KWH.
2. The power required is more than 100 KWH. In the case of condition 1, the consumer can operate his load with the remaining 10 KWH without the necessity of inserting a new chip. Under these conditions, although alarm device 34 continues its operation, when the integrating watt-hour meter 10 completes the integration of 100 KWH, the permanent magnet 13 carried by digit wheel 12 of the order of tens, is moved away from reed switch 14 as above described, the relay P will be deenergized to close its contact $p_1$ and operate transfer switch $P_2$ from contact $P_{22}$ to contact $P_{21}$. Consequently, relay S is energized to disengage latch $L_4$ from lever $L_3$ due to the fact that $r_1$ previously has closed on $r_{11}$ due to energization of T thereby opening main contacts $R_1$ and $R_2$. The supply of electric power then is interrupted. Accordingly, alarm device 34 and relay S are deenergized.

In the case of condition 2, the customer will insert a new chip into the chip receiver 30 while alarm device 34 is operating. Insertion of the new chip closes reed switch 38 to energize relay Q. Although contact $q_1$ is closed by energization of Q, contact $p_1$ still is open so that relay R is not energized to hold its contact $r_2$ in the closed condition. Consequently, current is not passed through fuse 63 of the new chip. Energization of relay Q opens its contact $q_2$ to deenergize alarm device 34. When the remaining 10 KWH or a total of 100 KWH is supplied, reed switch 14 opens to deenergize relay P. As a result its contact $p_1$ is closed to energize relay R. Since contacts $R_1$ and $R_2$ have been maintained closed by the mechanical interlocking mechanism, power is continuously supplied. Thereafter, the operation proceeds in the same manner as above described in connection with the first chip.

While the embodiment relates to the supply of single phase power, it will be clear that the invention can equally be applied to three phase power. As is well known in the art, when necessary, a circuit breaker may be used in conjunction with switch 20 for interrupting overcurrent.

The load may be any power consuming device. In the case of a residence, the load may comprise all household appliances. Further, the load may be a television receiver or a washing machine, separately supplied by the present invention, in which case the user, must employ special chips sold for the purpose of operating the television receiver, washing machine, etc.

As above described the invention provides a new and improved apparatus for supplying a predetermined measured quantity of electric power wherein a specially designed chip is used to close a switch interconnecting a load and a source for supplying thereto a predetermined amount power corresponding to the amount of power authorized by the chip. So long as the power consumed is within the predetermined quantity, the remaining power can be used at any later time. As the power consumed approaches the predetermined quantity, an alarm is operated informing the user that an additional chip should be inserted. Thus, the invention enables continuous or intermittent consumption of electric power.

What is claimed is:

1. Apparatus for supplying a predetermined measured quantity of electric power to a load comprising an integrating watt-hour meter, a signal transmitter operated by said watt-hour meter for developing an electrical alarm signal only upon the range of consumed power as measured by the integrating watt-hour meter falling between a value smaller than said predetermined quantity and said predetermined quantity, a main power switch connected between said watt-hour meter and said load, chip receiver means for receiving a destructible chip to be inserted into said chip receiver means for actuating the apparatus, alarm means responsive to said electrical alarm signal, means responsive to the insertion of a chip into said chip receiver means for closing said main power switch, means responsive to the insertion of a chip into said chip receiver means for automatically invalidating the destructible chip as a genuine chip, and means responsive to the predetermined measured quantity of electric power being supplied for opening said main power switch in the absence of a new chip being inserted in the chip receiver means.

2. The apparatus according to claim 1 which further includes means for locking a chip in said chip receiver means after insertion, said means being responsive to said electrical alarm signal to release the invalidated chip from said chip receiver means before said predetermined value is reached thus permitting insertion of a new chip.

3. The apparatus according to claim 1 wherein said signal transmitter comprises a reed switch and a permanent magnet carried by a digit wheel of a predetermined order of said integrating watt-hour meter.

4. The apparatus according to claim 1 wherein authentic chips, are provided with a removable check piece and said chip receiver means has means for removing the check piece from the chip and for retaining the removed check piece upon the chip being inserted in said chip receiver means.

5. Apparatus for supplying a predetermined measured quantity of electric power to a load comprising an integrating watt-hour meter, a signal transmitter operated by said watt-hour meter for developing an electrical alarm signal within a range of consumed power as measured by the integrating watt-hour meter between a value smaller than said predetermined quantity and said predetermined quantity, a main power switch including a control relay connected between said watt-hour meter and said load, chip receiver means including a second switch means, alarm means responsive to said electrical alarm signal, said chip receiver means being adapted to receive a specially designated chip inserted into said chip receiver to actuate the apparatus with the specially designed chip having a fusible element, means for operating said second switch means in said chip receiver means upon a chip being inserted into said chip receiver means whereupon said second switch means closes said main power switch and said fusible element melts to open the control relay to said main power switch, lever-catch means operated by said control relay for maintaining said main power switch in the closed condition until said electrical alarm signal is terminated, and means responsive to the predetermined measured quantity of electric power being supplied for opening said main power switch in the absence of a new chip being inserted in the ship receiver means.

6. The apparatus according to claim 5 further including a counter that counts the number of chips inserted into said chip receiver.

7. The apparatus according to claim 5 wherein said second switch means comprises a reed switch and said means for operating said second switch means comprises a permanent magnet formed on the chip for closing said second switch means.

8. The apparatus according to claim 5 which further includes means for locking a chip in said chip receiver means after insertion, said means being responsive to said electrical alarm signal to release said chip from said chip receiver means before said predetermined value is reached thus permitting insertion of a new chip.

9. The apparatus according to claim 8 wherein said signal transmitter comprises a reed switch and a permanent magnet carried by a digit wheel of a predetermined order of said integrating watt-hour meter.

10. The apparatus according to claim 9 wherein said second switch means comprises a reed switch and said means for operating said second switch means comprises a permanent magnet formed on the chip for closing said second switch means.

* * * * *